(12) United States Patent
Hierro

(10) Patent No.: US 10,556,807 B2
(45) Date of Patent: Feb. 11, 2020

(54) DEVICE FOR TREATING WATER FOR HOUSEHOLD USE

(71) Applicant: Alain Hierro, Torrevieja (ES)

(72) Inventor: Alain Hierro, Torrevieja (ES)

(*) Notice: Subject to any disclaimer, the term of this patent is extended or adjusted under 35 U.S.C. 154(b) by 0 days.

(21) Appl. No.: 15/758,864

(22) PCT Filed: Sep. 2, 2016

(86) PCT No.: PCT/ES2016/070621
§ 371 (c)(1),
(2) Date: Mar. 9, 2018

(87) PCT Pub. No.: WO2017/046431
PCT Pub. Date: Mar. 23, 2017

(65) Prior Publication Data
US 2018/0282179 A1    Oct. 4, 2018

(30) Foreign Application Priority Data
Sep. 17, 2015   (ES) .................................. 201531322

(51) Int. Cl.
*C02F 1/00*   (2006.01)
*C02F 1/50*   (2006.01)
(Continued)

(52) U.S. Cl.
CPC .............. *C02F 1/003* (2013.01); *B01D 24/22* (2013.01); *B01D 2101/02* (2013.01);
(Continued)

(58) Field of Classification Search
CPC .. C02F 1/003; C02F 1/467; C02F 1/44; C02F 1/505; C02F 2303/04; C02F 1/281;
(Continued)

(56) References Cited

U.S. PATENT DOCUMENTS

| 2,103,425 | A | * | 12/1937 | Lehman | ................... E03C 1/086 |
| | | | | | 210/449 |
| 2,368,035 | A | * | 1/1945 | Moore | ................... B01D 35/04 |
| | | | | | 210/317 |
| 4,536,290 | A | | 8/1985 | Bonazzo | |
| 5,322,625 | A | | 6/1994 | Rise | |

(Continued)

FOREIGN PATENT DOCUMENTS

DE   2164965 A1   7/1973
EP   1 106 225 A1   6/2001

OTHER PUBLICATIONS

International Search Report of PCT/ES2016/070621, dated Nov. 8, 2016.

*Primary Examiner* — Madeline Gonzalez
(74) *Attorney, Agent, or Firm* — Collard + Roe PC

(57) ABSTRACT

A device for treating water for household use designed so as to be temporarily coupled to the mouth of a faucet to allow the continuous supply of treated water and the water to be treated being guided radially through the inside thereof. The device is formed by means of coupling a cylindrical receptacle to an upper closing element, where the receptacle supports, on the inside thereof, a paddle blind on which a hollow, cylindrical-shaped membrane is supported, where the membrane accumulates a filter bed therein. The inner wall of the receptacle is provided with ribs that extend longitudinally so as to define channels through which the treated water flows. The upper closing element is provided with grooves for the inflow of water to be treated, on which sealing means are supported for the coupling to the faucet.

8 Claims, 4 Drawing Sheets

(51) Int. Cl.
*B01D 24/22* (2006.01)
*C02F 1/28* (2006.01)
*C02F 1/42* (2006.01)
*C02F 1/44* (2006.01)
*C02F 1/467* (2006.01)

(52) U.S. Cl.
CPC ...... *B01D 2201/4092* (2013.01); *C02F 1/281* (2013.01); *C02F 1/283* (2013.01); *C02F 1/42* (2013.01); *C02F 1/44* (2013.01); *C02F 1/467* (2013.01); *C02F 1/505* (2013.01); *C02F 2201/006* (2013.01); *C02F 2303/04* (2013.01); *C02F 2307/06* (2013.01)

(58) Field of Classification Search
CPC ...... C02F 1/283; C02F 1/42; C02F 2201/006; C02F 2307/06; B01D 24/22; B01D 2101/02; B01D 2201/4092; B01D 35/30
USPC ....... 210/449, 439, 446, 458, 470, 473, 489, 210/283, 284, 289, 291
See application file for complete search history.

(56) References Cited

U.S. PATENT DOCUMENTS

| | | | |
|---|---|---|---|
| 5,494,222 A * | 2/1996 | Chiu | B01D 35/04 |
| | | | 210/449 |
| 5,656,160 A | 8/1997 | Parise et al. | |
| 5,665,224 A | 9/1997 | Levene et al. | |
| 7,473,362 B1 | 1/2009 | Nohren, Jr. | |
| 2006/0243654 A1 * | 11/2006 | Lee | B01D 35/04 |
| | | | 210/445 |
| 2007/0095744 A1 * | 5/2007 | Bagci | B01D 29/21 |
| | | | 210/435 |
| 2009/0188854 A1 * | 7/2009 | Farrelly | C02F 1/003 |
| | | | 210/282 |

* cited by examiner

DEVICE FOR TREATING WATER FOR HOUSEHOLD USE

CROSS REFERENCE TO RELATED APPLICATIONS

This application is the National Stage of PCT/ES2016/070621 filed on Sep. 2, 2016, which claims priority under 35 U.S.C. § 119 of Spanish Application No. P201531322 filed on Sep. 17, 2015, the disclosures of which are incorporated by reference. The international application under PCT article 21(2) was not published in English.

OBJECT OF THE INVENTION

The present invention relates to a device for treating water for household use and continuous production the configuration of which easily allows being temporarily connected to a flowing water faucet, the essential function thereof being to thoroughly filter the water passing therethrough. Specifically, the device enables treating water in at least two stages, a first pre-filtration stage through a filter bed and a second filtration stage through non-woven fabric filtering means, a membrane or filter paper.

The device is characterized by a novel configuration which allows the fluid to go through the stages in an effectively optimal manner via radial flow, all while having a portable configuration due to its small dimensions, a disposable configuration and being easy to couple to the mouth of the faucet without requiring complex installations.

The device for treating water can be applied to any type of faucet, and enables treating and producing water under continuous flow, particularly in a household setting.

BACKGROUND OF THE INVENTION

Filtration through a filter bed and filtration through non-woven fabric or fiber stand out among known filtration water treatments.

In that sense, in filtration through a filter bed, the untreated water goes through filtering means arranged in the form of a bed. Granular activated carbon (GAC) and/or ion exchange resin are often used as filtering means for household devices.

The untreated water flows through the gaps of the filter bed, where the granular activated carbon (GAC) traps chemical contaminants by means of a process of adsorption, and the ion exchange resin traps ions dissolved in the water. The efficiency of the process depends on the contact time of the water with the filtering means.

Filtration through a filter bed is not able to trap pathogenic microorganisms (viruses or bacteria) and its efficiency with other contaminants is limited by the grain size distribution of the bed.

On the other hand, filtration through non-woven fabric or fiber is a surface filtration based on a sieving effect. Solids do not enter the filtering means, but rather are trapped on the surface thereof, since the pore size of the filtering means is smaller than the size of the solid particles.

Sieves, fabrics, filter paper or membranes can be used as filtering means. These means may include in the composition thereof complementary filtration materials, such as powdered activated carbon (PAC), which allows for adsorption with a shorter contact time and greater efficiency compared to granular activated carbon (GAC) for a filter bed.

This filtration means can reach the microfiltration or ultrafiltration threshold and is capable of trapping the pathogenic microorganisms. The efficiency thereof in trapping contaminating agents of another type is greater than that of the process of filtering through a filter bed.

Devices for treating water, such as water filtration jugs for household use, are well known today. These systems only use means for filtering through a filter bed, which is generally granular activated carbon (GAC), and are primarily designed to improve the taste and appearance of the water, but in no case do they remove pathogenic microorganisms.

On the other hand, there are portable systems designed for outdoor use which use filtration means such as non-woven fiber or fabric membranes. This is the case of filter bottles, which are systems that are more effective for filtering out pathogenic microorganisms (bacteria, viruses, etc.) and other contaminating agents, but their filtration capacity is quite low.

Other portable devices are fitted to the faucet and filter the running water under continuous flow, but their efficiency is limited only to filtering through a filter bed, and they do not have the capacity to trap pathogenic microorganisms. In fact, they are characterized by being made up of a small reservoir housing a filter element that requires being periodically replaced.

Patent document US05665224A discloses a filter jug. The device allows filtering water by means of a filter bed, primarily granular activated carbon (GAC) and ion exchange resin. This device uses gravity and the communicating vessels principle to filter water, but it does not act on pathogenic microorganisms and its effect on other contaminating agents is low.

These devices are limited to improving the taste of water from the faucet and reducing some contaminating agents, do not allow filtering continuously flowing water and are limited to treating a certain amount of water according to the volume of the filter jug.

Furthermore, it requires the use of filter cartridges that are periodically replaced.

Patent document U.S. Pat. No. 7,473,362B1 discloses a portable device consisting of a bottle or canteen that allows filtering water by means of a membrane filter located in the upper part of the container and which must be periodically replaced by means of a system of replacement parts.

The drawback of this type of device is that it does not allow being used under continuous flow since it cannot be coupled to the mouth of the faucet and it is limited to the capacity of the container.

The devices that have been known up until now generally suffer from being unable to act on a continuous flow of water, and those that perform this function do not assure complete sanitization of the water. Furthermore, the known configurations do not possess the specific functional characteristics to enable high-quality water treatment for household use.

For this reason there is a need to provide portable systems for treating water that require no installation, which combine being more functional and being more economically affordable for consumers.

DISCLOSURE OF THE INVENTION

The device for treating water for household use that is proposed is designed so as to be temporarily coupled on the mouth of a primarily running water faucet, which thereby enables treating the water under continuous flow.

The object of the present invention is to provide an effective system for treating water that assures protection against pathogenic microorganisms and other contaminants.

Unlike known devices, the proposed invention uses as primary filtration filtering means based on non-woven fabric, membrane or filter paper which allows removing contaminants such as pathogenic microorganisms (bacteria, viruses, etc.), and chemical or biochemical contaminating agents, and furthermore having pre-filtration through a filter bed made up of activated carbon, an electrolytic component KDF, zeolite and/or ion exchange resin. The processed water is therefore entirely sanitized, i.e., the treated water is virtually contaminating agent-free.

The device of the invention preferably has a cylindrical outer shape, the upper part thereof being provided with a hole for the temporary coupling thereof to the mouth of the faucet while treating the water, and in the lower part it has a hole for continuous treated water outflow.

More specifically, the device for treating water for household use of the invention is formed from a cylindrical-shaped receptacle housing filtering means therein.

The receptacle supports on the inside thereof, specifically in the lower part, a paddle or spade blind-type element that forces the water to flow radially from the inside of the device outwardly. This paddle blind has flanges at the base acting as spacers which are supported on the bottom of the receptacle and allow raising the spade blind with respect to the bottom of the receptacle, leaving a space for accumulating treated water before it flows out. The spacers have dimensions that enable the water to flow towards the outlet without experiencing a pressure drop.

The hollow, cylindrical-shaped filtering means are supported on the spade blind, and the length of said filtering means extends completely or partially along the inside of the device.

The hollow, cylindrical-shaped filtering means are made up of a non-woven fabric, a membrane or filter paper, which enables filtration, microfiltration or even ultrafiltration.

Optionally, both the filtering means and the pre-filtration bed may include a bacteriostatic agent, such as silver ions, in the composition thereof to prevent the proliferation of bacteria in the actual filtration means.

Optionally, both the filtering means and the pre-filtration bed may include powdered activated carbon (PAC) in the composition thereof to enable adsorption of the water to be treated.

A filter bed enabling pre-filtration accumulates in the cavity of the hollow cylinder created by the filtering means.

The receptacle is provided on the inner wall thereof with a plurality of embossments or ribs that extend longitudinally for the purpose of enabling the definition of channels through which the treated water flows after passing through the filtering means.

These ribs extend internally from close to or on the bottom of the receptacle to a position adjacent to the upper part of the receptacle, thereby forming longitudinal channels for collecting treated water.

A cover-like upper closing element is coupled on the receptacle, said upper closing element being provided with grooves or perforations at the base thereof through which the water to be treated flows. This upper element can be screwed on, press fit or attached by welding with respect to the receptacle when changing the pre-filtration bed or filtering means is not envisaged, thereby allowing the elements to be integrated such that they form an assembly that is attached so as to form a single part.

Optionally, the sealing means for the coupling of the device of the invention to the faucet consists of arranging on the upper element an elastomer in the form of a diaphragm having a hole in the central part thereof for the purpose of being correctly coupled to the mouth of the faucet of the water to be treated.

The primary filtration is assured because the filtering means may have one or more layers of membrane, non-woven fabric or filter paper and it has a surface filtration, ultrafiltration, microfiltration, electroadsorption and/or adsorption function.

The configuration of the device allows the treated water to flow to the pre-filtration bed, where it will flow on the inside thereof by means of radial flow from the inner part of the bed to the outer part, later passing through filtration means by radial flow, being collected in the collectors formed on the inner face of the receptacle as a result of the presence of ribs.

Therefore, the radial flow of the water from the inner part to the outer part of the device means that the pressure exerted by the water on the filtering means is enough for it to be correctly placed and for it to not be necessary for these filtering means to surround, for example, a perforated tube collector. The present invention therefore has no inner support which the filtering means need to surround, rendering the configuration thereof less complex and the cost of manufacture and assembly thereof more cost-effective.

The present invention thereby provides a new and improved system for treating water that can be manufactured with a low cost due to the low complexity of the elements forming it, and can accordingly be sold at a lower sale price for consumers, making said device a system for treating water that is economically affordable for the public.

In fact, this low manufacturing cost makes it of interest to not replace the membranes, fabrics, filter papers or beds, such that the device is directly disposed of after a certain use over time and replaced with a new one, which is a much simpler operation than having to replace membranes and/or beds.

Accordingly, for this disposable feature to be viable, the structural parts of the invention have been designed such that they are more cost-effective than the devices known today.

The filter of the invention allows treating running water in a household setting, primarily water from the faucet, said filter being portable, disposable and capable of filtering instantaneously and continuously without previously storing water in a reservoir.

DESCRIPTION OF THE DRAWINGS

To complement the description provided below and for the purpose of helping to better understand the features of the invention according to a preferred practical embodiment thereof, a set of drawings is attached as an integral part of said description in which the following is depicted with an illustrative and non-limiting character.

PREFERRED EMBODIMENT OF THE INVENTION

Figure 1:
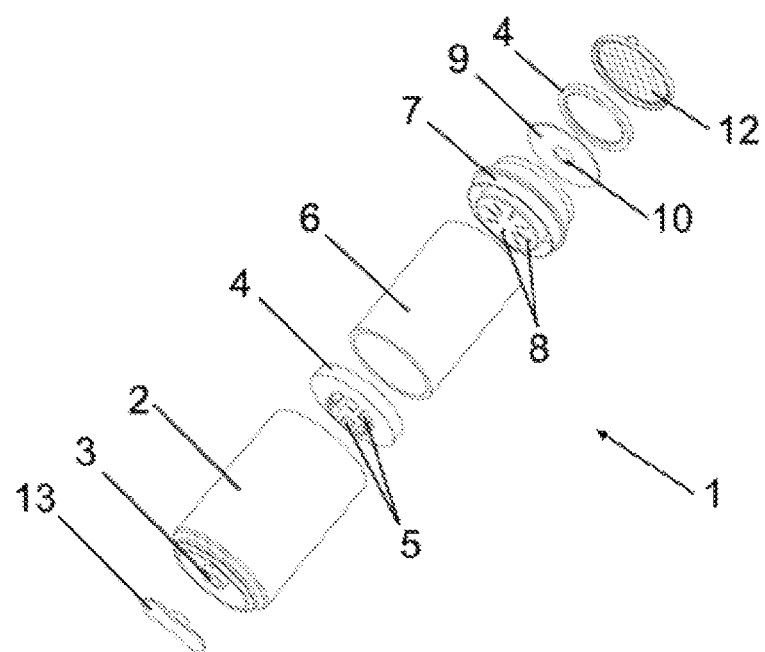
FIG. 1 shows an exploded perspective view of the different elements forming the device for treating water of the invention.

As can be seen in FIG. 1, the portable and disposable device for treating water (1) preferably has a cylindrical outer shape and is made up of a receptacle (2), which is open in the upper portion and provided with a hole (3) in the lower area thereof which allows the outflow of the water.

The receptacle (2) houses filtering means (6) made of non-woven fabric, membrane or filter paper therein which is arranged forming a hollow cylinder and the length of which extends completely or partially along the inside of the device.

A paddle blind-type element (4) is supported on the bottom of the receptacle (2) which forces the water to flow radially from the inner part to the outer part of the device. This spade or paddle blind has flanges at the base acting as spacers (5) which allow leaving a space for accumulating treated water before it flows out through the lower hole (3) of the receptacle (2) without experiencing a pressure drop.

Figure 2:
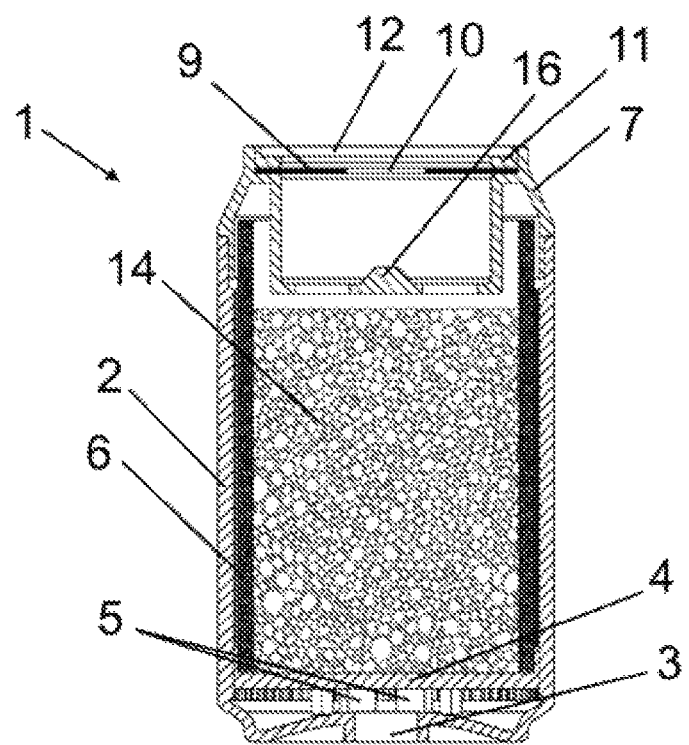
FIG. 2 shows a section view of the device of the invention having been duly assembled.

As can be seen in FIGS. 1 and 2, in the cavity of the hollow cylinder created by the filtering means (6) there is arranged a pre-filtration bed (14), in the form granules, beads, or any of another type of ion exchange and/or filter bed.

A cover-like upper closing element (7) is placed on the receptacle, said upper closing element being provided with a plurality of grooves (8) through which the water to be treated flows. The upper closing element defines a cavity the inside of which will house the mouth of the faucet when the device of the invention (1) is temporarily coupled to the mentioned faucet. At the base of this cavity, the closing element has grooves (8) with a dimension that does not allow outflow from the pre-filtration bed (14) which is housed in the cavity formed by the filtering means (6).

The upper closing element (7) can be screwed on, press fit or attached by welding with respect to the receptacle when changing the pre-filtration bed (14) or the filtering means (6) is not envisaged.

This upper closing element (7) has a perforated inner base inner by way of grooves (8) for the purpose of enabling the passage of water to be treated into the pre-filtration bed (14).

It can be seen in FIG. 2 that the cavity formed by the filtering means (6) can receive therein a filter bed for performing filtration through a filter bed, said filter bed having a pre-filtration function and preferably being made up of activated carbon (GAC), an electrolytic component KDF, ion exchange resin or any other means for treating water with a graduated grain size distribution.

The upper closing element (7) is provided on its upper border with sealing means that allow the inflow of water and can be coupled to different mouth diameters of running water faucets. These sealing means are preferably made up of an elastomer (9) acting like a diaphragm. The diaphragm (9) preferably has a planar and flexible shape with a hole (10) in the central part thereof and is fixed to the upper closing element (7) using mechanical means (11) in the form of a washer, which is fixed by welding or bonding.

Finally, the device of the invention is provided with a cover (12) for covering the area of the diaphragm and with a stopper (13) for covering the outlet opening for the treated water (3) when the device is not in use, preventing the circulation of air and assuring the sanitary conditions of the device.

As seen in FIG. 2, the upper closing element (7) is equipped on its lower border with a stop (16) in the form of a protuberance projecting at the base and having the purpose of limiting the depth up to which the mouth of the faucet is inserted into the device.

Figure 3:
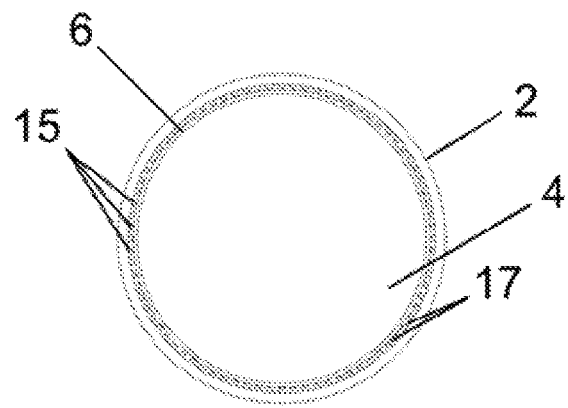
FIG. 3 shows a plan view of the receptacle and the separating element that are part of the device of the invention.
Figure 4:
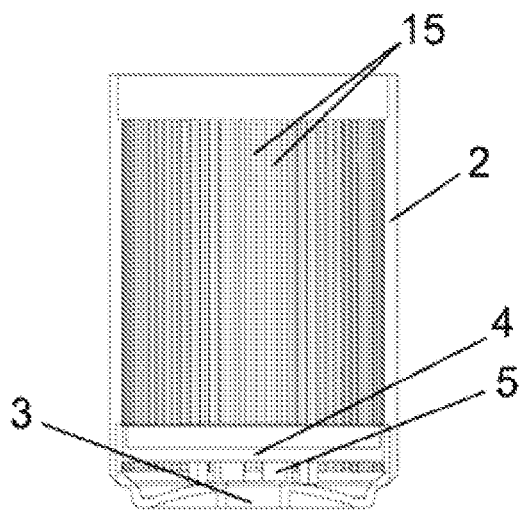
FIG. 4 shows a section view of the elements depicted in the preceding figure, where the inner face of the receptacle can be seen.

It can be seen in FIGS. 2, 3, and 4 that the receptacle (2) of the device (1) is provided on the inner face thereof with embossments or ribs (15) that extend longitudinally for the purpose of enabling the formation of channels through which the treated water flows after passing through the filtering means (6).

Figure 5:
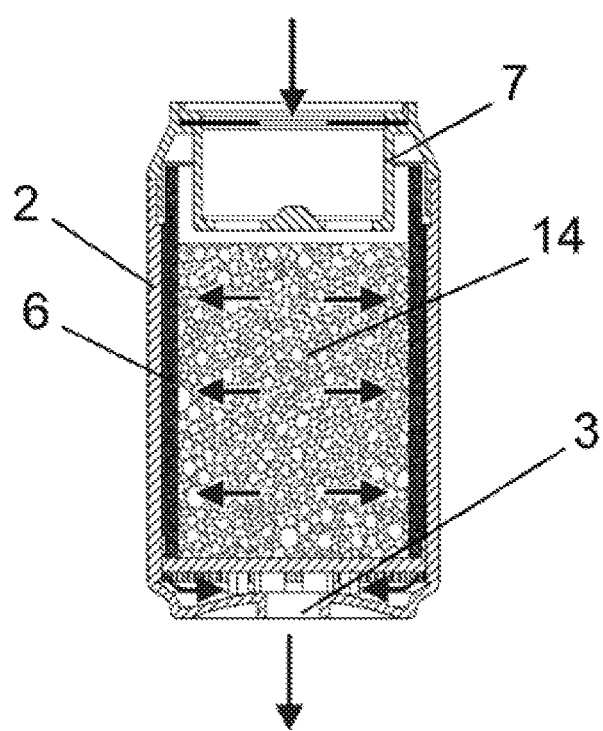
FIG. 5 shows a section view of the device of the invention depicted in FIG. 2, in which the path of the water flow therein has been depicted.

As can be seen in FIG. 5, the filtering means (6) are coupled on the entire periphery of the inner surface of the receptacle (2). The plurality of ribs (15) that the receptacle (2) has enable the formation of treated water collectors (17) in the cavities thereof, allowing the water to flow between the filtering means (6) and the inner surface of the receptacle (2) to the outlet (3).

The invention claimed is:

1. A device for treating water for household use and being configured to be temporarily coupled to the mouth of a faucet to allow the continuous supply of treated water, wherein the device comprises:
   a cylindrical-shaped receptacle equipped with a lower hole and having an open upper portion, defining an opening, the receptacle having an inner wall with a plurality of ribs that extend longitudinally so as to define channels through which the treated water flows,
   an upper closing element coupled to the upper portion to cover the opening, the upper closing element having grooves for the inflow of water to be treated into the device,
   a paddle blind supported on an inside of a lower part of the receptacle,
   cylindrical-shaped filtering means supported on the paddle blind, where said filtering means accumulates a pre-filtration bed therein, and
   sealing means connected to the upper closing element and being configured for coupling the device to the faucet, wherein the sealing means is a diaphragm made of elastomer and having a hole in a central part thereof and being configured for receiving the faucet in the hole to couple to the device to the faucet, wherein the hole is configured to receive faucets having mouths of varying diameters.

2. The device for treating water for household use according to claim 1, wherein the sealing means of the upper closing element (7) is provided with a washer for the fixing of the elastomer, which is fixed by welding or bonding to the upper closing element (7).

3. The device for treating water for household use according to claim 1, wherein the paddle blind (4) supported on the bottom of the receptacle (2) has flanges at the base acting as spacers (5) which are supported on the bottom of the receptacle, having dimensions that enable the treated water to flow towards the lower hole (3) without experiencing a pressure drop.

4. The device for treating water for household use according to claim 1, wherein the filtering means (6) are made up of a non-woven fabric, membrane and/or filter paper.

5. The device for treating water for household use according to claim 4, wherein the filtering means (6) include a bacteriostatic agent.

6. The device for treating water for household use according to claim 1, wherein the pre-filtration bed (14) is made up of activated carbon, an electrolytic component, zeolites and/or ion exchange resins.

7. The device for treating water for household use according to claim 6, wherein the pre-filtration bed (14) has a membrane that includes a bacteriostatic agent.

8. The device for treating water for household use according to claim 1, wherein the upper closing element (7) is coupled to the receptacle (2) by screwing on, press fitting or attaching by welding.

* * * * *